(12) United States Patent
Jang (10) Patent No.: US 9,142,191 B2
(45) Date of Patent: Sep. 22, 2015

(54) POWER SUPPLYING APPARATUS AND DISPLAY APPARATUS INCLUDING THE SAME

(71) Applicant: LG Display Co., Ltd., Seoul (KR)

(72) Inventor: Hoon Jang, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 84 days.

(21) Appl. No.: 14/134,321

(22) Filed: Dec. 19, 2013

(65) Prior Publication Data

US 2014/0184664 A1   Jul. 3, 2014

(30) Foreign Application Priority Data

Dec. 31, 2012 (KR) .................... 10-2012-0158711

(51) Int. Cl.
| | |
|---|---|
| *G09G 5/10* | (2006.01) |
| *H02H 1/04* | (2006.01) |
| *H02H 3/24* | (2006.01) |
| *H02H 7/125* | (2006.01) |
| *G09G 3/20* | (2006.01) |
| *G09G 3/34* | (2006.01) |
| *G09G 3/36* | (2006.01) |

(52) U.S. Cl.
CPC .. *G09G 5/10* (2013.01); *G09G 3/20* (2013.01); *G09G 3/3406* (2013.01); *G09G 3/3696* (2013.01); *H02H 1/04* (2013.01); *H02H 3/24* (2013.01); *H02H 7/125* (2013.01); *G09G 2300/0408* (2013.01); *G09G 2300/0426* (2013.01); *G09G 2310/0259* (2013.01); *G09G 2320/0673* (2013.01); *G09G 2330/028* (2013.01)

(58) Field of Classification Search
CPC ..... H02J 1/14; G09G 5/10; G09G 2300/0408; G09G 2300/0426; G09G 2310/0259; G09G 2320/0673; G09G 2330/028; G09G 3/20; G09G 3/3406; G09G 3/3696
See application file for complete search history.

(56) References Cited

U.S. PATENT DOCUMENTS

2009/0218954 A1*  9/2009  Lin et al. .................. 315/250

* cited by examiner

*Primary Examiner* — Gerald Johnson
(74) *Attorney, Agent, or Firm* — Fenwick & West LLP

(57) ABSTRACT

A power supplying apparatus is disclosed, in which an under voltage lock out function is not performed for instantaneous voltage dip even in case that a reference under voltage detection voltage is set at high level. The power supplying apparatus comprises an under voltage detector generating an under voltage lock out signal by detecting voltage dip of an input power and performing an under voltage protection function, wherein the under voltage detector delays the input power for a delay time, which is set, to generate the under voltage lock out signal.

20 Claims, 7 Drawing Sheets

“POWER SUPPLYING APPARATUS AND DISPLAY APPARATUS INCLUDING THE SAME

CROSS REFERENCE TO RELATED APPLICATIONS

This application claims priority under 35 U.S.C. §119(a) from Korean Patent Application No. 10-2012-0158711 filed on Dec. 31, 2012, which is hereby incorporated by reference for all purposes as if fully set forth herein.

BACKGROUND OF THE INVENTION

1. Field of the Invention

The present invention relates to a power supplying apparatus and a display apparatus including the same.

2. Discussion of the Related Art

Generally, a power supplying apparatus rectifies an alternating current voltage and converts the alternating current voltage to a direct current voltage, or provides a direct current voltage required for various apparatuses (for example, display device and light emitting diode) by boosting or decompressing an alternating current voltage to a direct current voltage.

Figure 1:
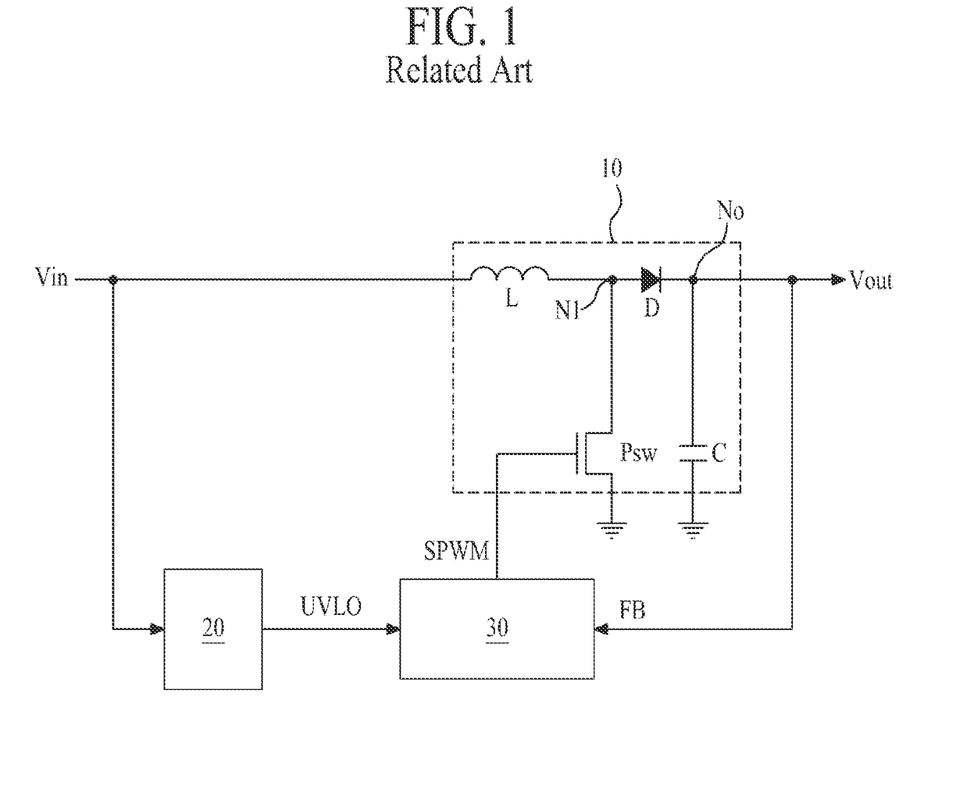
FIG. 1 is a diagram illustrating a power supplying apparatus according to the related art.

FIG. 1 is a diagram illustrating a power supplying apparatus of the related art.

Referring to FIG. 1, the power supplying apparatus of the related art includes a direct current-to-direct current converter 10, an under voltage detector 20, and a switching controller 30.

The direct current-to-direct current converter 10 converts an input power Vin to a direct current voltage and outputs the converted voltage. The direct current-to-direct current converter 10 includes an inductor L, a diode D, a switching element Psw, and a capacitor C. The direct current-to-direct current converter 10 converts the input power Vin to the direct current voltage in accordance with switching of the switching element Psw based on a pulse width modulation signal SPWM supplied from the switching controller 30. In other words, if the switching element Psw is turned on, a current flows to the inductor L by means of the input power Vin, whereby energy is accumulated in the inductor L. If the switching element Psw is turned off, the energy accumulated in the inductor L is added to the input power Vin, is rectified by the diode D, and is planarized by the capacitor C, whereby the energy is output as an output voltage Vout.

Figure 2:
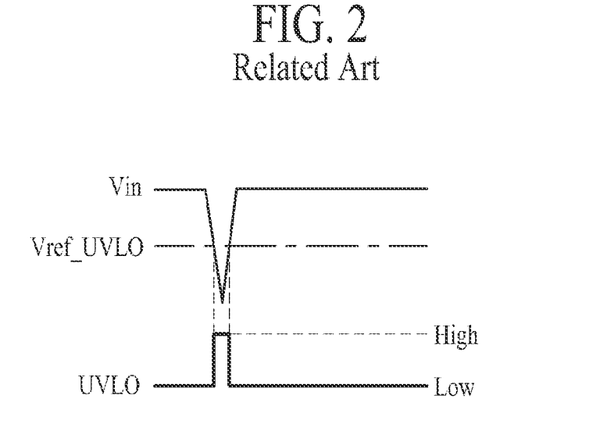
FIG. 2 is a waveform illustrating an operation of an under voltage detector shown in FIG. 1.

The under voltage detector 20, as shown in FIG. 2, generates an under voltage lock out signal UVLO of a high state and supplies the generated under voltage lock out signal to the switching controller 30 only if the voltage of the input power Vin is less than a reference under voltage detection voltage Vref_UVLO, thereby preventing a circuit, to which the input power Vin is supplied, from being operated in error.

The switching controller 30 generates a pulse width modulation signal SPWM by receiving the output voltage Vout fed back from the direct current-to-direct current converter 10, and uniformly controls the output voltage Vout of the direct current-to-direct current converter 10 by using the pulse width modulation signal SPWM only if the under voltage lock out UVLO signal of low state is supplied from the under voltage detector 20.

Meanwhile, according to the power supplying apparatus of the related art, if load is increased instantaneously and instantaneous voltage dip of the input power Vin occurs during inrush current, the under voltage lock out UVLO signal of high state is generated by the under voltage detector 20, whereby the under voltage lock out function may be performed. In order to prevent the circuit, to which the input power Vin is supplied, from being operated in error, during abnormal voltage dip of the input power Vin, the under voltage lock out function should be performed. However, in the display apparatus, etc., it may be preferable for stable operation that instantaneous voltage dip of the input power Vin is disregarded.

In this respect, in the power supplying apparatus applied to the display apparatus, the reference under voltage detection voltage Vref_UVLO is lowered so that the under voltage lock out function may not be performed during instantaneous voltage dip of the input power Vin, whereby the voltage range of the input power Vin is increased.

Figure 3:
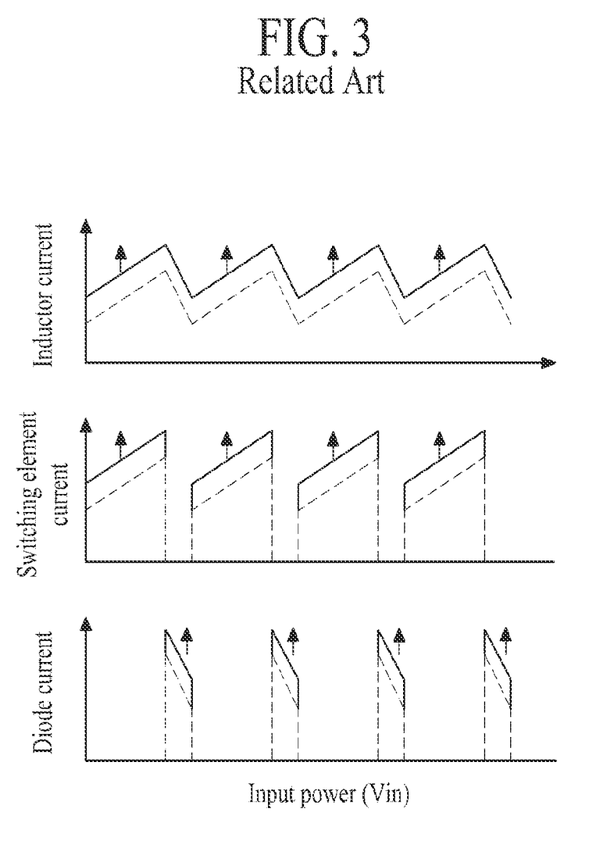
FIG. 3 is a waveform illustrating current change based on an input power of each of a switching element, an inductor and a diode shown in FIG. 1.

However, if the reference under voltage detection voltage Vref_UVLO for the under voltage lock out function is lowered to increase the voltage range of the input power Vin, the input current needs to be increased as the input power Vin is lowered. For this reason, as shown in FIG. 3, since the input current of each of the switching element Psw, the inductor L and the diode D is increased in accordance with the change of the input power Vin, a problem occurs in that a chip size of the integrated circuit IC is increased and current rating of each of the switching element Psw, the inductor L and the diode D should be enhanced. In order to solve this problem, if the reference under voltage detection voltage Vref_UVLO for the under voltage lock out function is increased, the under voltage lock out function is performed even in case of instantaneous voltage dip.

Accordingly, it is required that the under voltage lock out function should not be performed for instantaneous voltage dip even in case that the reference under voltage detection voltage Vref_UVLO is set at high level.

SUMMARY OF THE INVENTION

Accordingly, the present invention is directed to a power supplying apparatus and a display apparatus including the same, which substantially obviates one or more problems due to limitations and disadvantages of the related art.

An advantage of the present invention is to provide a power supplying apparatus and a display apparatus including the same, in which an under voltage lock out function is not performed for instantaneous voltage dip even in case that a reference under voltage detection voltage is set at high level.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a power supplying apparatus according to the present invention comprises an under voltage detector generating an under voltage lock out signal by detecting a voltage dip of an input power and performing an under voltage protection function, wherein the under voltage detector delays the input power for a delay time, which is set, to generate the under voltage lock out signal.

The power supplying apparatus further comprises a direct current-direct current converter converting the input power to a direct current voltage in accordance with switching of a switching element; and a switching controller controlling switching of the switching element on a basis of the under voltage lock out signal.

In another aspect of the present invention, a display apparatus comprises a display panel including a pixel formed in a pixel region defined by gate lines and data lines which cross each other; a panel driver for driving the pixel; and a power supply converting an input power to a direct current voltage and supplying the direct current voltage to the panel driver, wherein the power supply includes the power supplying apparatus.

The panel driver includes a reference gamma voltage generator generating a plurality of reference gamma voltages; a data driving circuit converting pixel data using the plurality of reference gamma voltages to a data voltage and supplying the data voltage to the data lines; a gate driving circuit supplying a gate signal to the gate lines; and a timing controller controlling driving of the data driving circuit and the gate driving circuit and supplying the pixel data to the data driving circuit, wherein the power supply generates and supplies the direct current voltage required for driving of at least one of the reference gamma voltage generator, the data driving circuit, the gate driving circuit and the timing controller.

The display apparatus further comprises a back light unit for irradiating light to the display panel; and a back light driver driving the back light unit, wherein the power supply further generates another direct current voltage required for driving of the back light driver and supplies said another direct current voltage.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the exemplary embodiments of the present invention, examples of which are illustrated in the accompanying drawings. Wherever possible, the same reference numbers will be used throughout the drawings to refer to the same or like parts.

The terminologies disclosed in this specification should be understood as follows.

The singular expression used in this specification includes the plural expression unless meant differently on the context. The terminologies such as "first" and "second" are intended to identify one element from another element, and it is to be understood that the scope of the present invention should not be limited by these terminologies.

Also, it is to be understood that the terminologies such as "include" and "has" are intended not to exclude the presence or optional possibility of one or more features, numbers, steps, operations, elements, parts or their combination.

It is to be understood that the terminology such as "at least one" is intended to include all possible combinations that may be suggested from one or more related elements. For example, "at least one of a first element, a second element and a third element" means combination of all the elements that may be suggested from two or more of the first element, the second element and the third element, as well as each of the first element, the second element and the third element.

Hereinafter, the power supplying apparatus and the display apparatus including the same according to the present invention will be described in detail with reference to the accompanying drawings.

Figure 4:
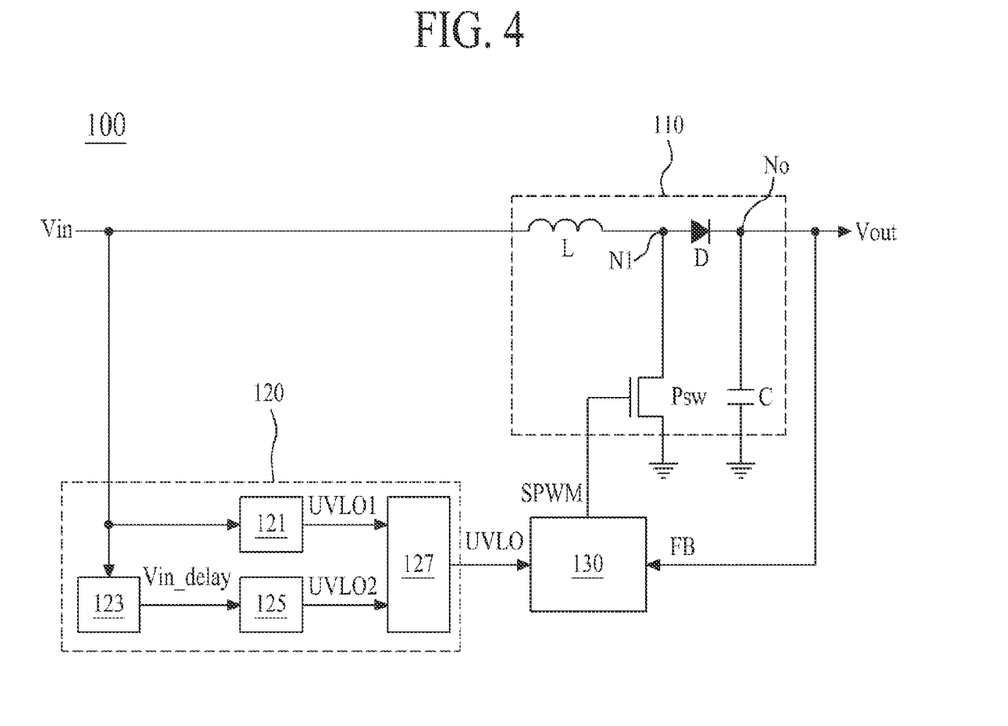
FIG. 4 is a diagram illustrating a power supplying apparatus according to the first embodiment of the present invention.
Figure 5A:
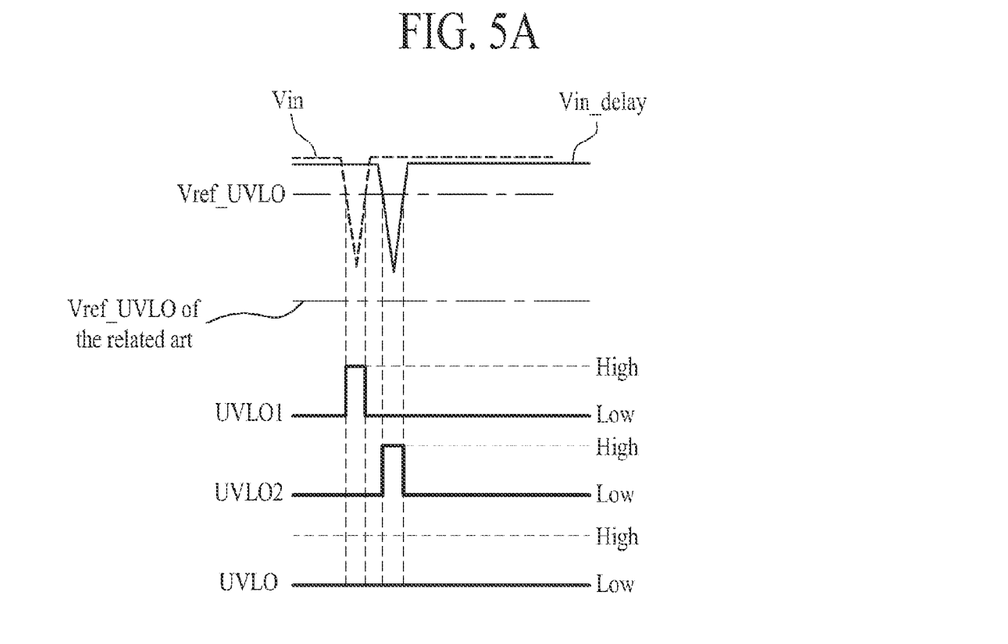
FIGS. 5A and 5B are diagrams illustrating an under voltage lock out signal output from an under voltage detector shown in FIG. 4.
Figure 5B:
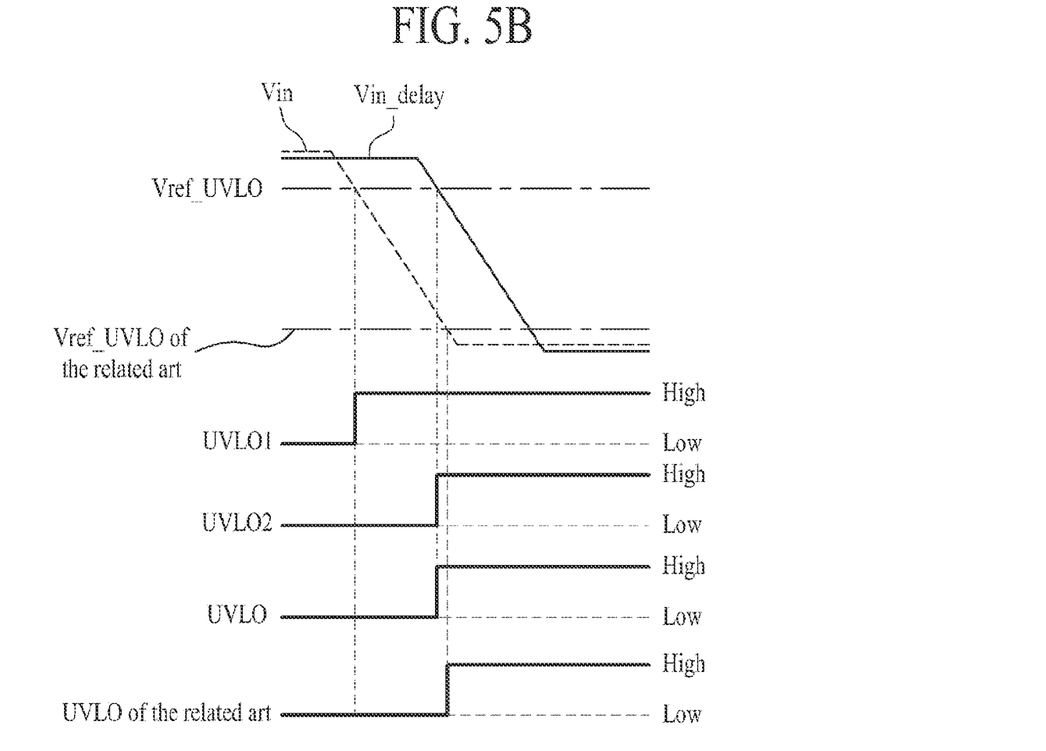

FIG. 4 is a diagram illustrating a power supplying apparatus according to the first embodiment of the present invention, and FIGS. 5A and 5B are diagrams illustrating an under voltage lock out signal output from an under voltage detector shown in FIG. 4.

Referring to FIGS. 4, 5A and 5B, the power supplying apparatus according to the first embodiment of the present invention includes a direct current-to-direct current converter 110, an under voltage detector 120, and a switching controller 130.

The direct current-to-direct current converter 110 converts an input power Vin to a direct current voltage to output the converted voltage, and includes an inductor L, a diode D, a switching element Psw, and a capacitor C. The direct current-to-direct current converter 110 converts the input power Vin to the direct current voltage in accordance with switching of the switching element Psw based on a pulse width modulation signal SPWM supplied from the switching controller 130. In other words, if the switching element Psw is turned on, a current flows to the inductor L by means of the input power Vin, whereby energy is accumulated in the inductor L. If the switching element Psw is turned off, the energy accumulated in the inductor L is added to the input power Vin, is rectified by the diode D, and is planarized by the capacitor C, whereby the energy is output as an output voltage Vout.

The under voltage detector 120 generates an under voltage lock out signal UVLO of a high state and supplies the generated under voltage lock out signal to the switching controller 130 only if the voltage of the input power Vin is less than a reference under voltage detection voltage Vref_UVLO, thereby preventing the circuit, to which the input power Vin is supplied, from being operated in error. To this end, the under voltage detector 120 includes a first under voltage detecting means 121, a delay means 123, a second under voltage detecting means 125, and a logic gate 127.

The first under voltage detecting means 121 generates a first under voltage lock out signal UVLO1 of high state if the voltage of the input power Vin is dropped to be less than the reference voltage detection voltage Vref_UVLO, and generates a first under voltage lock out signal UVLO1 of low state if the voltage of the input power Vin exceeds the reference voltage detection voltage Vref_UVLO and supplies the generated first under voltage lock out signal UVLO1 of low state to the logic gate 127. In this case, the reference under voltage detection voltage Vref_UVLO is set to a voltage level relatively higher than the reference under voltage detection voltage Vref_UVLO of the related art.

The delay means 123 delays the input power Vin as much as the delay time which is set and supplies the delayed input power Vin_delay to the second under voltage detecting means 125.

The second under voltage detecting means 125 generates the second under voltage lock out signal UVLO2 of high state if the voltage of the delayed input power Vin_delay is dropped to be less than the reference under voltage detection voltage Vref_UVLO, and generates the second under voltage lock out signal UVLO2 of low state and supplies the generated second under voltage lock out signal UVLO2 to the logic gate 127 if the voltage of the delayed input power Vin_delay exceeds the reference under voltage detection voltage Vref_UVLO.

The logic gate 127 generates a final under voltage lock out signal UVLO by performing logic operation (for example, AND operation) for the first and second under voltage lock out signals UVLO1 and UVLO2. In other words, the logic gate 127 generates the under voltage lock out signal UVLO of high state if the first and second under voltage lock out signals UVLO1 and UVLO2 are high logic states, and generates the under voltage lock out signal UVLO of low state if not so and supplies the generated under voltage lock out signal to the switching controller 130.

The under voltage detector 120 does not output the under voltage lock out signal UVLO of high state if the input power Vin is instantaneously dropped to be less than the reference under voltage detection voltage Vref_UVLO, as shown in FIG. 5A, by delaying the input power Vin as much as the delay time, which is set, through the delay means 123, whereas the under voltage detector 120 outputs the under voltage lock out signal UVLO of high state if the input power Vin is dropped to be less than the reference under voltage detection voltage Vref_UVLO for a certain time, as shown in FIG. 5B. Accordingly, the under voltage detector 120 does not perform the under voltage protection function in case of instantaneous voltage drip of the input power Vin, and performs the under voltage protection function when voltage dip of the input power Vin is less than the reference under voltage detection voltage Vref_UVLO for a certain time. As a result, the power supplying apparatus 100 according to the present invention may set the reference under voltage detection voltage Vref_UVLO to be higher than that of the related art.

The switching controller 130 generates a pulse width modulation signal SPWM by receiving the output voltage Vout fed back from the direct current-to-direct current converter 100, and uniformly controls the output voltage Vout of the direct current-to-direct current converter 100 by using the pulse width modulation signal SPWM only if the under voltage lock out UVLO signal of low state is supplied from the under voltage detector 120.

Meanwhile, the switching element Psw of the direct current-to-direct current converter 110, the under voltage detector 120 and the switching controller 130 may be built in one integrated circuit IC.

Figure 6:
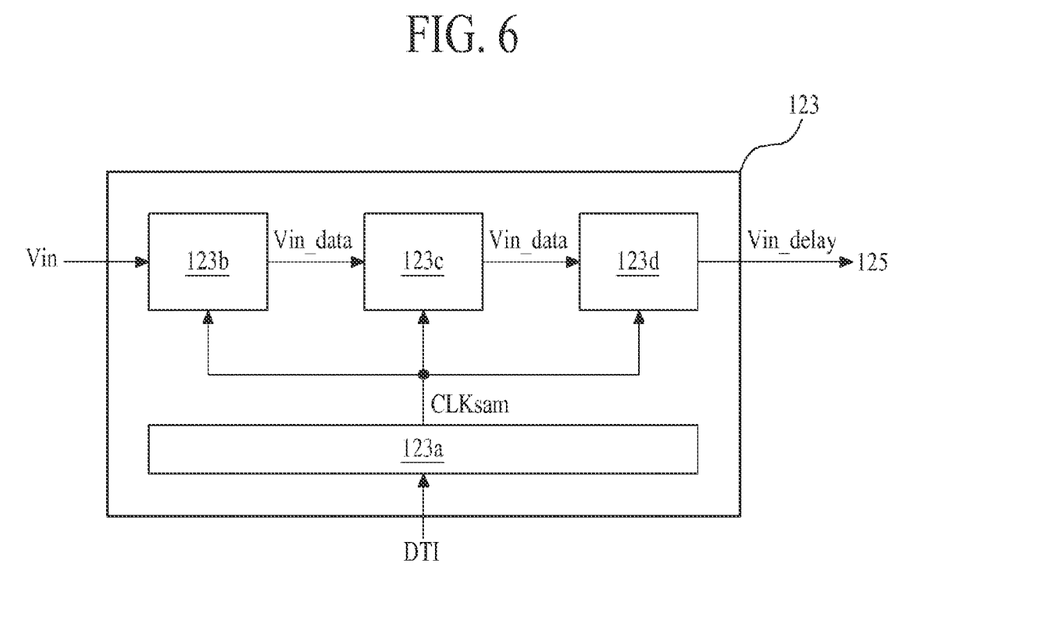
FIG. 6 is a block diagram illustrating a delay means included in the under voltage detector shown in FIGS. 5A and 5B.
Figure 7:
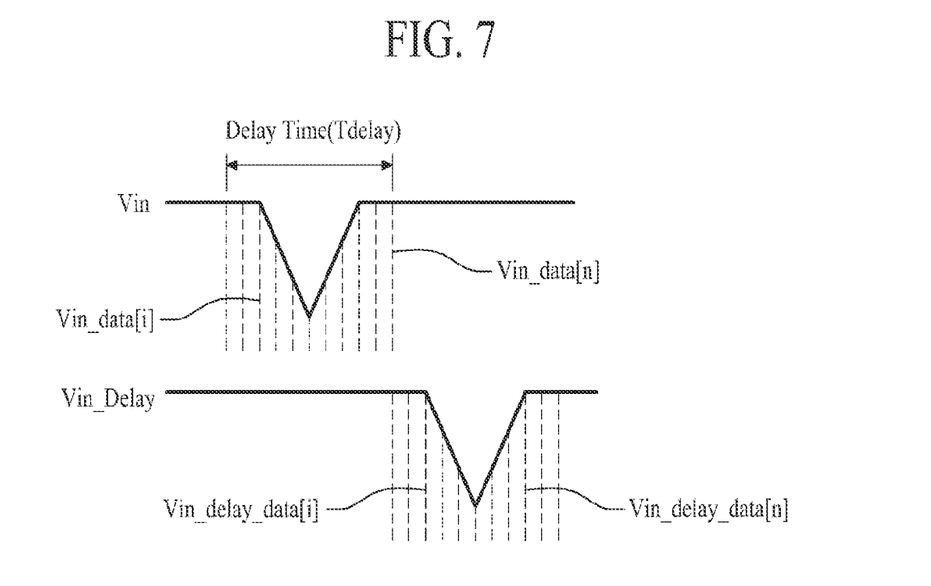
FIG. 7 is a waveform illustrating an input power delayed by the delay means shown in FIG. 6.

FIG. 6 is a block diagram illustrating a delay means included in the under voltage detector shown in FIGS. 5A and 5B. FIG. 7 is a waveform illustrating an input power delayed by the delay means shown in FIG. 6.

Referring to FIGS. 6 and 7, the delay means 123 according to one embodiment includes a sampling clock generator 123a, an analog-to-digital converter 123b, a first in first output buffer 123c, and a digital-to-analog converter 123d.

The sampling clock generator 123a generates first to nth sampling clocks CLKsam which are set at a predetermined period, and supplies the generated sampling clocks to the analog-to-digital converter 123d, the first in first out buffer 123c, and the digital-to-analog converter 123d. At this time, the frequency of the sampling clocks CLKsam may be set by the following Equation 1.

$$CLKsam = \frac{1}{n \times Tdelay} \quad \text{[Equation 1]}$$

In the Equation 1, Tdelay means the delay time set by a user, n means the number of sampling clocks for the delay time or the number of registers of the first in first out buffer.

The analog-to-digital converter 123b generates first to nth power sampling data Vin_data corresponding to the voltage level of the input power Vin every sampling time according to each of the first to nth sampling clocks CLKsam, and inputs the generated the first to nth sampling data Vin_data to the first in first output buffer 123c.

The first in first out buffer 123c stores the first to nth power sampling data Vin_data input from the analog-to-digital converter 123b in accordance with the first to nth sampling clocks CLKsam, and outputs the first to nth power sampling data Vin_data stored based on the first in first output manner in accordance with the first to nth sampling clocks CLKsam.

The digital-to-analog converter 123d converts the first to nth power sampling data Vin_data output from the first in first out buffer 123c to the analog voltage in accordance with the first to nth sampling clocks CLKsam to generate the delayed input power Vin_delay, and supplies the delayed input power Vin_delay to the second under voltage detecting means 125.

The delay means 123 according to one embodiment generates the power sampling data Vin_data by sampling the input power Vin in accordance with the sampling clocks CLKsam and stores the generated power sampling data Vin_data in the first in first out buffer 123c, and generates the analog type delayed input power Vin_delay from the power sampling data Vin_data output from the first in first out buffer 123c in accordance with the sampling clocks CLKsam. For example, as shown in FIG. 7, if voltage dip of the input power Vin occurs at the sampling time according to the ith sampling clock CLKsam, the power sampling data Vin_data[i] sampled by the ith sampling clock CLKsam is stored in the first in first out buffer 123c, output from the first in first out buffer 123c after the delay time Tdelay, which is set, converted to the analog type by the digital-to-analog converter 123d, and supplied to the second under voltage detecting means 125.

Figure 8:
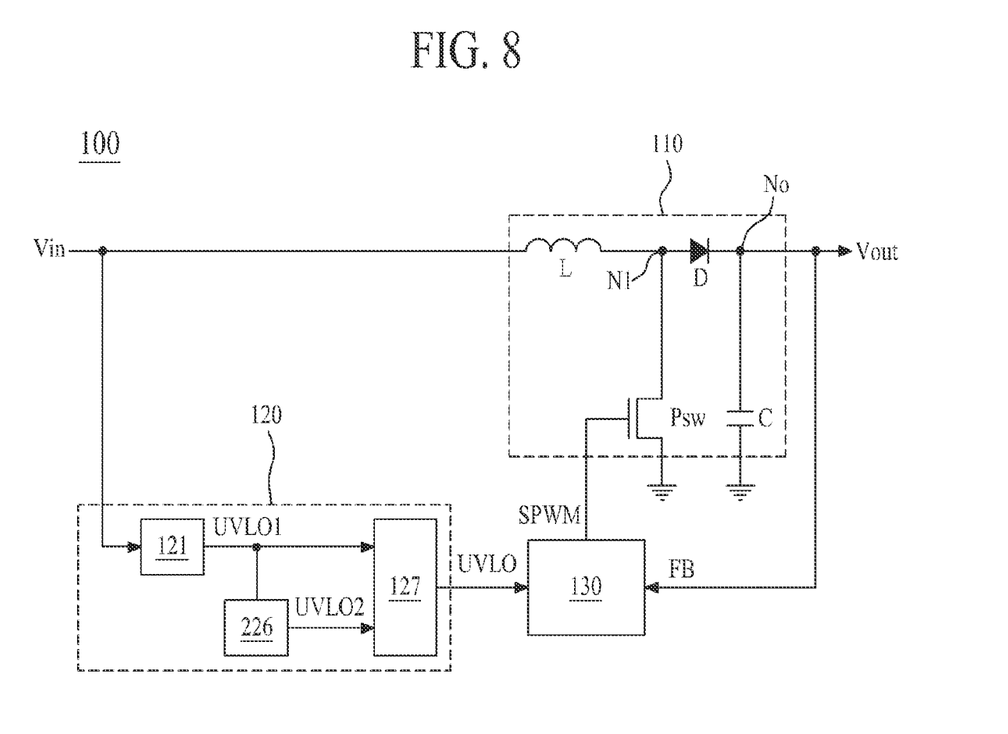
FIG. 8 is a diagram illustrating a power supplying apparatus according to the second embodiment of the present invention.

FIG. 8 is a diagram illustrating a power supplying apparatus according to the second embodiment of the present invention, which is configured by changing the under voltage detector. Hereinafter, the under voltage detector will be described.

The under voltage detector 120 includes an under voltage detecting means 121, a delay means 226, and a logic gate 127.

The under voltage detecting means 121 generates a first under voltage lock out signal UVLO1 of high state if the voltage of the input power Vin is dropped to be less than the reference voltage detection voltage Vref_UVLO, and generates a first under voltage lock out signal UVLO1 of low state if the voltage of the input power Vin exceeds the reference voltage detection voltage Vref_UVLO and supplies the generated first under voltage lock out signal UVLO1 of low state to the delay means 226 and the logic gate 127.

The delay means 226 delays the first under voltage lock out signal UVLO1 supplied from the under voltage detecting means 121 as much as the delay time which is set and supplies the delayed signal to the logic gate 127 as the second under voltage lock out signal UVLO2.

The logic gate 127 generates a final under voltage lock out signal UVLO by performing AND operation with the first and second under voltage lock out signals UVLO1 and UVLO2. In other words, the logic gate 127 generates the under voltage lock out signal UVLO of high state if the first and second under voltage lock out signals UVLO1 and UVLO2 are high logic states, and generates the under voltage lock out signal UVLO of low state if not so and supplies the generated under voltage lock out signal to the switching controller 130.

The under voltage detector 120 does not output the under voltage lock out signal UVLO of high state if the input power Vin is instantaneously dropped to be less than the reference under voltage detection voltage Vref_UVLO, as shown in FIG. 5A, by delaying the first under voltage lock out signal UVLO1 as much as the delay time, which is set, through the delay means 123, whereas the under voltage detector 121 outputs the under voltage lock out signal UVLO of high state if the input power Vin is dropped to be less than the reference under voltage detection voltage Vref_UVLO for a certain time, as shown in FIG. 5B. Accordingly, the under voltage detector 120 does not perform the under voltage protection function in case of instantaneous voltage drip of the input power Vin, and performs the under voltage protection function when voltage dip of the input power Vin is less than the reference under voltage detection voltage Vref_UVLO for a certain time.

Figure 9:
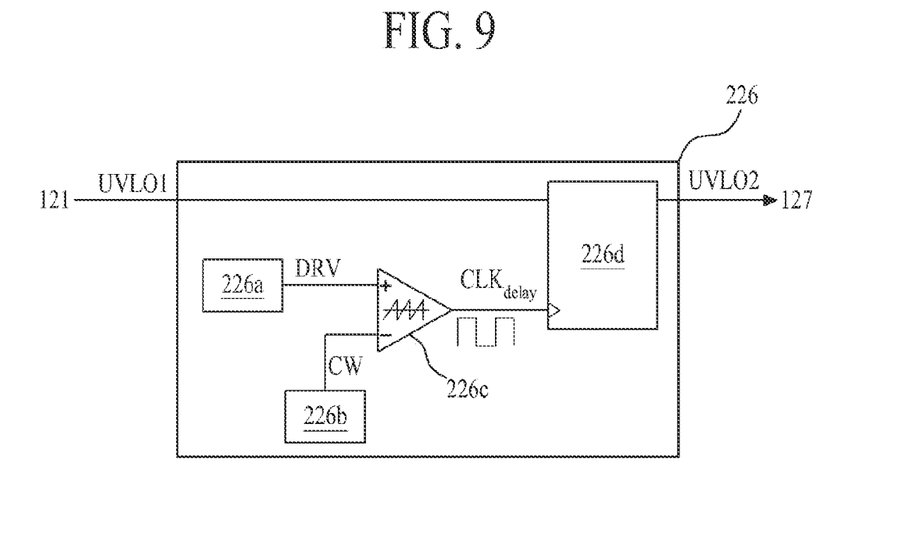
FIG. 9 is a block diagram illustrating a delay means included in the under voltage detector shown in FIG. 8.

FIG. 9 is a block diagram illustrating a delay means included in the under voltage detector shown in FIG. 8.

Referring to FIG. 9 together with FIG. 8, the delay means 226 according to another embodiment includes a delay reference voltage generator 226a, a triangular wave generator 226b, a delay clock generator 226c, and a second under voltage lock out signal generator 226d.

The delay reference voltage generator 226a generates a delay reference voltage DRV which has a constant voltage set variably or previously by a user, and supplies the generated delay reference voltage DRV to the delay clock generator 226c. For example, the delay reference voltage generator 226a may be comprised of a voltage dividing circuit based on resistance or a voltage dividing circuit that includes variable resistance.

The triangular wave generator 226b generates a triangular wave CW having a constant period and supplies the generated triangular wave CW to the delay clock generator 226c. For example, the triangular wave generator 226b may include an oscillating circuit (not shown), which generates a reference clock of a constant frequency, and a counter (not shown) which outputs a triangular wave CW by counting the reference clock.

The delay clock generator 226c generates a delay clock $CLK_{delay}$ having a high period and a low period based on the delay reference voltage DRV input from the delay reference voltage generator 226a on the basis of the triangular wave CW input from the triangular wave generator 226b and supplies the generated delay clock $CLK_{delay}$ to the second under voltage lock out signal generator 226d. This delay clock generator 226c may include a comparator such as an operation amplifier, wherein a voltage DTL of the delay time level is input to a non-inverting terminal (+) of the comparator and the triangular wave CW is input to an inverting terminal (−) of the comparator.

The second under voltage lock out signal generator 226d delays the first under voltage lock out signal UVLO1 supplied from the under voltage detecting means 121 in accordance with the delay clock $CLK_{delay}$ supplied from the delay clock generator 226c and supplies the delayed first under voltage lock out signal UVLO1 to the logic gate 127 as the second under voltage lock out signal UVLO2. The second under voltage lock out signal generator 226d may be comprised of a D flip-flop, which outputs the first under voltage lock out signal UVLO1 by delaying the first under lock out signal UVLO1 in accordance with the delay clock $CLK_{delay}$.

The delay means 226 according to another embodiment generates the delay clock $CLK_{delay}$ having the delay time based on the delay reference voltage DRV set by the user, and generates the second under voltage lock out signal UVLO2 by delaying the first under voltage lock out signal UVLO1 as much as the period of the generated delay clock $CLK_{delay}$.

The aforementioned power supplying apparatus 100 according to the embodiments of the present invention performs the under voltage protection function if the input voltage Vin or the first under voltage lock out signal UVLO1 is less than the reference voltage detection voltage Vref_UVLO even after delaying the input power Vin or the first under voltage lock out signal UVLO1, whereby the under voltage lock out function is not performed for instantaneous voltage dip even in case that the reference under voltage detection voltage Vref_UVLO is set at high level.

Figure 10:
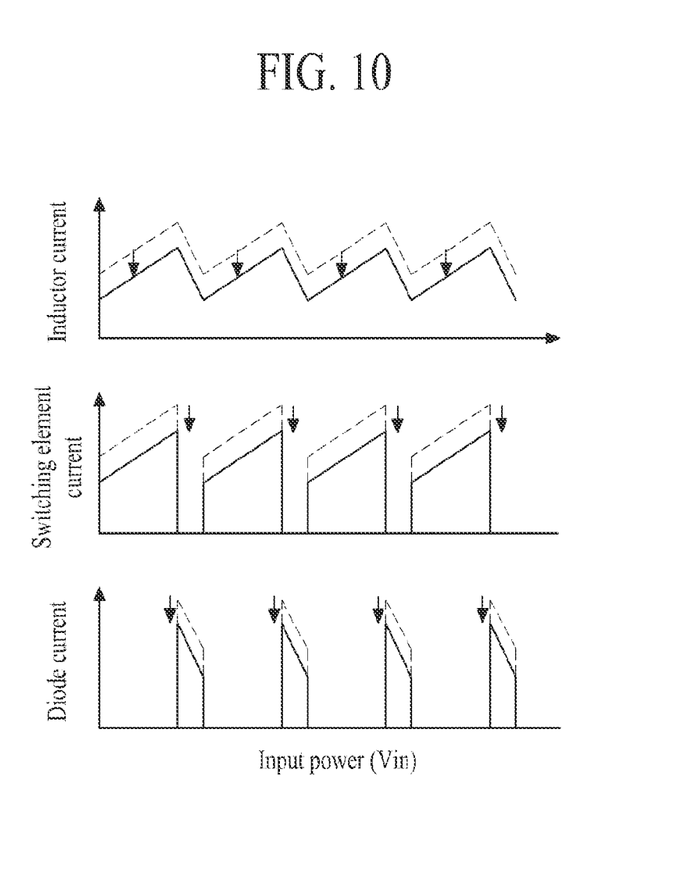
FIG. 10 is a waveform illustrating current change based on an input power of each of a switching element, an inductor and a diode included in the power supplying apparatus according to the present invention.

Accordingly, the power supplying apparatus 100 according to the embodiments of the present invention may set the reference under voltage detection voltage Vref_UVLO at a level relatively higher than that of the related art (see FIG. 5B). Also, since the limit of the input power Vin may be increased, the input current becomes small. For this reason, as shown in FIG. 10, since the input current of each of the switching element Psw, the inductor L and the diode D becomes small in accordance with change of the input power Vin, a chip size of the integrated circuit IC becomes small, and current rating of each of the switching element Psw, the inductor L and the diode D also becomes small.

Meanwhile, although the power supplying apparatus 100 according to the present invention includes one direct current-to-direct current converter 110 and one switching controller 130 in FIGS. 4 and 8, the power supplying apparatus 100 according to the present invention may include a plurality of direct current-to-direct current converters 110 and a plurality of switching controllers 130, wherein the direct current-to-direct current converters 110 and the switching controllers 130 are operated in accordance with the under voltage lock out signal UVLO supplied from one under voltage detector 120. In this case, some of the plurality of direct current-to-direct current converters 110 may be booster type direct current-to-direct current converters that output an output voltage Vout higher than the voltage level of the input power Vin, and the other direct current-to-direct current converters may be decompressed type direct current-to-direct current converters that output an output voltage Vout lower than the voltage level of the input power Vin.

The aforementioned power supplying apparatus 100 according to the present invention may be used as the power supplying apparatus of a flat panel display apparatus that includes a liquid crystal display device, an organic light emitting display device, or a plasma display device. Moreover, the aforementioned power supplying apparatus 100 according to the present invention may be applied to power supplying apparatuses of various information apparatuses that require a direct current voltage.

Figure 11:
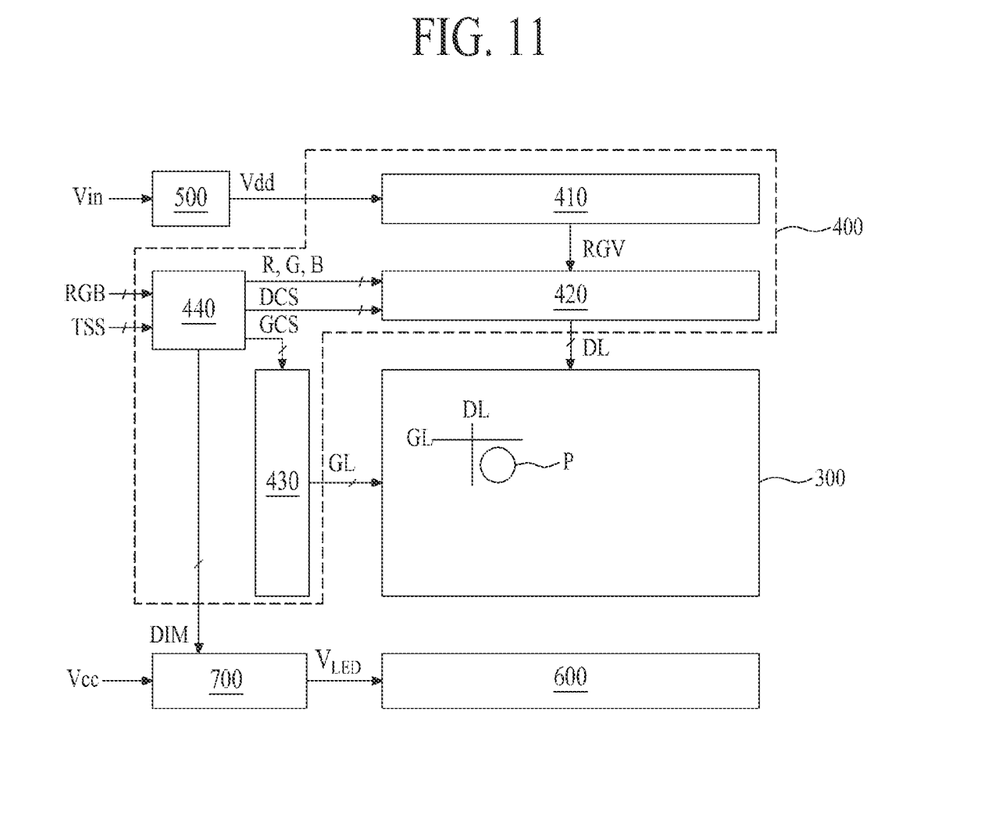
FIG. 11 is a diagram illustrating a display apparatus according to one embodiment of the present invention.

FIG. 11 is a diagram illustrating a display apparatus according to one embodiment of the present invention.

Referring to FIG. 11, the display apparatus according to one embodiment of the present invention includes a display panel 300, a panel driver 400, a power supply 500, a back light unit 600, and a back light driver 700.

The display panel 300 includes a plurality of pixels P formed per region defined by a plurality of gate lines GL and a plurality of data lines DL.

Each of the plurality of pixels P includes a thin film transistor (not shown) connected to the gate lines GL and the data lines DL, and a liquid crystal cell connected to the thin film transistor.

The display panel 300 displays a predetermined image by forming the electric field at a liquid crystal cell in accordance with a data voltage supplied to each pixel P and controlling transmittance of the light irradiated from the back light unit 600.

The panel driver 400 includes a reference gamma voltage generator 410, a data driving circuit 420, a gate driving circuit 430, and a timing controller 440.

The reference gamma voltage generator 410 may be implemented by a programmable gamma integrated circuit that generates a plurality of different reference gamma voltages RGV. This reference gamma voltage generator 410 generates a plurality of reference gamma voltages RGV having different voltage levels through voltage division between a high potential voltage Vdd for generating a reference gamma voltage and a low potential voltage from the power supply 500 in accordance with gamma voltage setting data, and supplies the generated reference gamma voltages RGV to the data driving circuit 420. At this time, the reference gamma voltage generator 410 may generate a plurality of reference gamma voltages RGV used commonly for each pixel P of a unit pixel or a plurality of reference gamma voltages RGV per color used separately (or independently) for each pixel P of a unit pixel.

The gamma voltage setting data may be stored in a memory, or may be supplied from the timing controller 440.

The data driving circuit 420 generates a plurality positive polarity/negative polarity gray voltages by segmenting the plurality of reference gamma voltages RGV supplied from the reference gamma voltage generator 410, latches pixel data R, G and B input from the timing controller 440 in accordance with a data control signal DCS supplied from the timing controller 440, converts the latched pixel data to positive polarity/negative polarity data voltages by using the plurality of positive polarity/negative polarity gray voltages, selects the positive polarity/negative polarity data voltage corresponding to a polarity control signal, and supplies the selected positive polarity/negative polarity gray voltage to the data lines DL.

The gate driving circuit 430 generates gate signals in accordance with a gate control signal GCS supplied from the timing controller 440 and supplies the generated gate signals to the gate lines GL in due order. In this case, the gate driving circuit 430 may be formed on the substrate at the same time when the thin film transistor is formed.

The timing controller 440 aligns externally input data RGB to pixel data R, G and B suitable for driving of the display panel 300 and then supplies the aligned data to the data driving circuit 420.

Also, the timing controller 440 generates a data control signal DCS and a gate control signal GCS for controlling operation timing of the data driving circuit 420 and the gate driving circuit 430 by using a timing synchronization signal TSS which is input. In this case, the timing synchronization signal TSS may include a vertical synchronization signal Vsync, a horizontal synchronization signal Hsync, a data enable signal, and a dot clock DCLK. The data control signal DCS may be a source start pulse, a source sampling clock, a source output enable signal, and a polarity control signal POL. The gate control signal may be a gate start pulse, a gate shift clock, and a gate output enable signal.

Also, the timing controller 440 generates a back light dimming signal DIM for controlling luminance of the back light unit 600 in accordance with brightness of an image of one frame and supplies the generated back light dimming signal to the back light unit 600. In this case, the timing controller 440 calculates an average image level by parsing input data RGB of one frame and generates a back light dimming signal DIM based on the calculated average image level. For example, if the image of one frame is determined as a relatively bright image in accordance with the average image level, the timing controller 440 generates a back light dimming signal DIM for reducing luminance of the back light unit 600. On the other hand, if the image of one frame is determined as a relatively dark image in accordance with the average image level, the timing controller 440 generates a back light dimming signal DIM for increasing luminance of the back light unit 600.

The power supply 500 generates and outputs a voltage required for driving of the display apparatus.

The power supply 500 according to one embodiment may generate the high potential voltage Vdd for generating a reference gamma voltage having a constant direct current voltage level by using the input power Vin and supply the generated high potential voltage Vdd to the reference gamma voltage generator 410. Since the power supply 500 is comprised of the power supplying apparatus 100 described with reference to FIGS. 3 to 10, its detailed description will be omitted.

The power supply 500 according to another embodiment may generate a constant voltage Vcc having a constant direct current voltage level as well as the high potential voltage Vdd for generating a reference gamma voltage by using the input power Vin and supply the generated voltages to the back light driver 700. In this case, the power supply 500 is comprised of the power supplying apparatus 100 described with reference to FIGS. 3 to 10, and further includes a direct current-to-direct current converter for generating the constant voltage Vcc and a switching controller, wherein the direct current-to-direct current converter and the switching controller are operated in accordance with the under voltage lock out signal output from the aforementioned under voltage detector 120. Likewise, the power supply 500 may generate and supply a driving voltage required for driving of each of the data driving circuit 420, the gate driving circuit 430, and the timing controller 440.

The back light unit 600 irradiates the light to the display panel 300 by using luminescence of a plurality of light emitting diodes. The back light unit 600 includes at least one light emitting diode array comprised of a plurality of light emitting diodes (LEDs) which are connected in series. In this case, the back light unit 600 may be an edge type back light unit or a direct type back light unit.

The back light driver 700 irradiates the light of brightness corresponding to the back light dimming signal DIM to the display panel 300 by modulating a pulse width and/or amplitude of a back light driving voltage $V_{LED}$ in accordance with the back light dimming signal DIM on the basis of the constant voltage Vcc supplied from the power supply 500 to drive the back light unit 600, that is, the light emitting diode array.

Meanwhile, since the aforementioned display apparatus includes the back light unit 600, the display apparatus may be the liquid crystal display apparatus. However, the display apparatus according to the present invention may be an organic light emitting display apparatus or a plasma display apparatus without limitation to the aforementioned liquid crystal display apparatus.

As described above, the advantages of present invention may be obtained as follows.

First of all, the input power is delayed for a certain time to generate the under voltage lock out signal for the under voltage protection function, whereby the under voltage lock out function is not performed for instantaneous voltage dip even in case that the reference under voltage detection voltage is set at high level, and the under voltage protection function is performed when voltage dip of the input power is less than the reference under voltage detection voltage for a certain time.

Also, the reference under voltage detection voltage may be set at high level as compared with the related art, and the limit of the input power may be increased, whereby the size of the power supplying apparatus may be reduced by the low input current and current rating of the switching element, the inductor and the diode may be optimized.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A power supplying apparatus comprising an under voltage detector generating an under voltage lock out signal by detecting a voltage dip of an input power and performing an under voltage protection function,
   wherein the under voltage detector delays the input power for a delay time, which is set, to generate the under voltage lock out signal.

2. The power supplying apparatus of claim 1, further comprising:
   a direct current-direct current converter converting the input power to a direct current voltage in accordance with switching of a switching element; and
   a switching controller controlling switching of the switching element on a basis of the under voltage lock out signal.

3. The power supplying apparatus of claim 2, wherein the under voltage detector includes:
   a first under voltage detecting means outputting a first under voltage lock out signal by detecting the voltage dip of the input power;
   a delay means delaying the input power for the delay time which is set;
   a second under voltage detecting means outputting a second under voltage lock out signal by detecting another voltage dip of the delayed input power; and
   a logic gate generating the under voltage lock out signal by performing logic operation with the first under voltage lock out signal and the second under voltage lock out signal.

4. The power supplying apparatus of claim 3, wherein the delay means includes:
   a sampling clock generator generating sampling clocks;
   an analog-to-digital converter generating power sampling data by sampling the input power in accordance with the sampling clocks;
   a first in first out buffer storing the power sampling data input from the analog-to-digital converter in accordance with the sampling clocks and outputting the power sampling data in accordance with a first in first out manner; and
   a digital-to-analog converter generating the delayed input power by converting the power sampling data output from the first in first out buffer to an analog type in accordance with the sampling clocks.

5. The power supplying apparatus of claim 2, wherein the under voltage detector includes:
   an under voltage detecting means outputting a first under voltage lock out signal by detecting the voltage dip of the input power;
   a delay means outputting a second under voltage lock out signal by delaying the first under voltage lock out signal supplied from the under voltage detecting means for the delay time which is set; and
   a logic gate generating the under voltage lock out signal by performing logic operation with the first under voltage lock out signal and the second under voltage lock out signal.

6. The power supplying apparatus of claim 5, wherein the delay means includes:
   a delay reference voltage generator generating a delay reference voltage;
   a triangular wave generator generating a triangular wave having a constant period;
   a delay clock generator generating a delay clock having a period corresponding to the set delay time by using the triangular wave and the delay reference voltage; and
   a second under voltage lock out signal generator outputting the second under voltage lock out signal by delaying the first under voltage lock out signal in accordance with the delay clock.

7. The power supplying apparatus of claim 6, wherein the second under voltage lock out signal generator is a D flip-flop.

8. A display apparatus comprising:
   a display panel including a pixel formed in a pixel region defined by gate lines and data lines which cross each other;
   a panel driver for driving the pixel; and
   a power supply converting an input power to a direct current voltage and supplying the direct current voltage to the panel driver,
   wherein the power supply includes the power supplying apparatus of claim 1.

9. The display apparatus of claim 8, wherein the panel driver includes:
   a reference gamma voltage generator generating a plurality of reference gamma voltages;
   a data driving circuit converting pixel data using the plurality of reference gamma voltages to a data voltage and supplying the data voltage to the data lines;
   a gate driving circuit supplying a gate signal to the gate lines; and
   a timing controller controlling driving of the data driving circuit and the gate driving circuit and supplying the pixel data to the data driving circuit,
   wherein the power supply generates and supplies the direct current voltage required for driving of at least one of the reference gamma voltage generator, the data driving circuit, the gate driving circuit and the timing controller.

10. The display apparatus of claim 9, wherein the power supplying apparatus further comprises:
a direct current-direct current converter converting the input power to the direct current voltage in accordance with switching of a switching element; and
a switching controller controlling switching of the switching element on a basis of the under voltage lock out signal.

11. The display apparatus of claim 10, wherein the under voltage detector includes:
a first under voltage detecting means outputting a first under voltage lock out signal by detecting the voltage dip of the input power;
a delay means delaying the input power for the delay time which is set;
a second under voltage detecting means outputting a second under voltage lock out signal by detecting another voltage dip of the delayed input power; and
a logic gate generating the under voltage lock out signal by performing logic operation with the first under voltage lock out signal and the second under voltage lock out signal.

12. The display apparatus of claim 11, wherein the delay means includes:
a sampling clock generator generating sampling clocks;
an analog-to-digital converter generating power sampling data by sampling the input power in accordance with the sampling clocks;
a first in first out buffer storing the power sampling data input from the analog-to-digital converter in accordance with the sampling clocks and outputting the power sampling data in accordance with a first in first out manner; and
a digital-to-analog converter generating the delayed input power by converting the power sampling data output from the first in first out buffer to an analog type in accordance with the sampling clocks.

13. The display apparatus of claim 10, wherein the under voltage detector includes:
an under voltage detecting means outputting a first under voltage lock out signal by detecting the voltage dip of the input power;
a delay means outputting a second under voltage lock out signal by delaying the first under voltage lock out signal supplied from the under voltage detecting means for the delay time which is set; and
a logic gate generating the under voltage lock out signal by performing logic operation with the first under voltage lock out signal and the second under voltage lock out signal.

14. The display apparatus of claim 13, wherein the delay means includes:
a delay reference voltage generator generating a delay reference voltage;
a triangular wave generator generating a triangular wave having a constant period;
a delay clock generator generating a delay clock having a period corresponding to the set delay time by using the triangular wave and the delay reference voltage; and
a second under voltage lock out signal generator outputting the second under voltage lock out signal by delaying the first under voltage lock out signal in accordance with the delay clock.

15. The display apparatus of claim 8, further comprising:
a back light unit for irradiating light to the display panel; and
a back light driver driving the back light unit,
wherein the power supply further generates another direct current voltage required for driving of the back light driver and supplies said another direct current voltage.

16. The display apparatus of claim 15, wherein the power supplying apparatus further comprises:
another direct current-direct current converter converting the input power to said another direct current voltage in accordance with switching of a switching element; and
a switching controller controlling switching of the switching element on a basis of the under voltage lock out signal.

17. The display apparatus of claim 16, wherein the under voltage detector includes:
a first under voltage detecting means outputting a first under voltage lock out signal by detecting the voltage dip of the input power;
a delay means delaying the input power for the delay time which is set;
a second under voltage detecting means outputting a second under voltage lock out signal by detecting another voltage dip of the delayed input power; and
a logic gate generating the under voltage lock out signal by performing logic operation with the first under voltage lock out signal and the second under voltage lock out signal.

18. The display apparatus of claim 17, wherein the delay means includes:
a sampling clock generator generating sampling clocks;
an analog-to-digital converter generating power sampling data by sampling the input power in accordance with the sampling clocks;
a first in first out buffer storing the power sampling data input from the analog-to-digital converter in accordance with the sampling clocks and outputting the power sampling data in accordance with a first in first out manner; and
a digital-to-analog converter generating the delayed input power by converting the power sampling data output from the first in first out buffer to an analog type in accordance with the sampling clocks.

19. The display apparatus of claim 16, wherein the under voltage detector includes:
an under voltage detecting means outputting a first under voltage lock out signal by detecting the voltage dip of the input power;
a delay means outputting a second under voltage lock out signal by delaying the first under voltage lock out signal supplied from the under voltage detecting means for the delay time which is set; and
a logic gate generating the under voltage lock out signal by performing logic operation with the first under voltage lock out signal and the second under voltage lock out signal.

20. The display apparatus of claim 19, wherein the delay means includes:
a delay reference voltage generator generating a delay reference voltage;
a triangular wave generator generating a triangular wave having a constant period;
a delay clock generator generating a delay clock having a period corresponding to the set delay time by using the triangular wave and the delay reference voltage; and a second under voltage lock out signal generator outputting the second under voltage lock out signal by delaying the first under voltage lock out signal in accordance with the delay clock.

* * * * *